(12) United States Patent
Jain et al.

(10) Patent No.: US 11,006,367 B2
(45) Date of Patent: May 11, 2021

(54) OPTIMIZING POWER CONSUMPTION IN MULTI-SIM DEVICES

(71) Applicant: QUALCOMM Incorporated, San Diego, CA (US)

(72) Inventors: Sachin Jain, Santa Clara, CA (US); Jayan Krishnaswami, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 15/961,636

(22) Filed: Apr. 24, 2018

(65) Prior Publication Data

US 2019/0014542 A1     Jan. 10, 2019

Related U.S. Application Data

(60) Provisional application No. 62/529,364, filed on Jul. 6, 2017.

(51) Int. Cl.
*H04W 52/02* (2009.01)
*H04W 72/04* (2009.01)
*H04W 24/02* (2009.01)
*H04W 76/28* (2018.01)
*H04L 5/00* (2006.01)
*H04W 88/02* (2009.01)

(52) U.S. Cl.
CPC ....... *H04W 52/0245* (2013.01); *H04W 24/02* (2013.01); *H04W 52/028* (2013.01); *H04W 52/0258* (2013.01); *H04W 52/0261* (2013.01); *H04W 52/0277* (2013.01); *H04W 72/0453* (2013.01); *H04L 5/001* (2013.01); *H04L 5/0091* (2013.01); *H04W 76/28* (2018.02); *H04W 88/02* (2013.01)

(58) Field of Classification Search
CPC ......... H04W 52/0245; H04W 52/0261; H04W 72/0453
See application file for complete search history.

(56) References Cited

U.S. PATENT DOCUMENTS 9,094,918 B2    7/2015   Bhogaraju et al.
9,521,676 B2   12/2016   Mani et al.
(Continued)

FOREIGN PATENT DOCUMENTS

GB          2492536 A     1/2013

OTHER PUBLICATIONS

International Search Report and Written Opinion—PCT/US2018/029444—ISA/EPO—dated Aug. 7, 2018.

*Primary Examiner* — Kodzovi Acolatse
*Assistant Examiner* — Farhad Ali
(74) *Attorney, Agent, or Firm* — QUALCOMM Incorporated

(57) ABSTRACT

A method and apparatus for optimizing power consumption in multi-subscriber identity module (SIM) devices in a wireless communication system is disclosed. For example, a UE may determine, in a Multi-Subscriber Identity Module (SIM) Multi-Subscriber (MSMS) mode, whether one of a plurality of subscriptions is configured as a Default Data Subscription (DDS) or a non-DDS; and perform a carrier aggregation power saving mode procedure for the one of the plurality of subscriptions based on a determination that the one of the plurality of subscriptions is configured as the DDS or the non-DDS.

28 Claims, 7 Drawing Sheets

(56) References Cited

U.S. PATENT DOCUMENTS

| | | | |
|---|---|---|---|
| 9,608,891 B2 | 3/2017 | Kollu et al. | |
| 2013/0303203 A1* | 11/2013 | Wang | H04W 68/00 |
| | | | 455/458 |
| 2015/0018040 A1* | 1/2015 | He | H04B 1/3816 |
| | | | 455/558 |
| 2015/0119103 A1 | 4/2015 | Ngai et al. | |
| 2015/0289141 A1 | 10/2015 | Ghasemzadeh et al. | |
| 2016/0157133 A1 | 6/2016 | Ehsan et al. | |
| 2016/0173031 A1 | 6/2016 | Langer et al. | |
| 2016/0242091 A1 | 8/2016 | Krishnamoorthy et al. | |
| 2017/0215065 A1* | 7/2017 | Vamanan | H04W 8/22 |

* cited by examiner

OPTIMIZING POWER CONSUMPTION IN MULTI-SIM DEVICES

CLAIM OF PRIORITY UNDER 35 U.S.C. § 119

The present Application for Patent claims priority to U.S. Provisional Application No. 62/529,364 entitled "OPTIMIZING POWER CONSUMPTION IN MULTI-SIM DEVICES" filed Jul. 6, 2017, which is assigned to the assignee hereof and hereby expressly incorporated by reference herein.

BACKGROUND

Aspects of the present disclosure relate generally to wireless communication networks, and more particularly, to optimizing power consumption in multi-subscriber identity module (SIM) devices in a wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond (and with Long Term Evolution (LTE communications technology), improvements in power consumption and carrier aggregation may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for optimizing power consumption in Multi-SIM devices for wireless communications. The described aspects include determining, by a user equipment (UE) in a Multi-SIM Multi-Subscriber (MSMS) mode, whether one of a plurality of subscriptions is configured as a Default Data Subscription (DDS) or a non-DDS. The described aspects further include performing, by the UE, a carrier aggregation power saving mode procedure for the one of the plurality of subscriptions based on a determination that the one of the plurality of subscriptions is configured as the DDS or the non-DDS.

In an aspect, an apparatus for enabling optimizing power consumption in Multi-SIM devices for wireless communications may include a transceiver, a memory; and at least one processor coupled with the memory and configured to determine, by a UE in a MSMS mode, whether one of a plurality of subscriptions is configured as a DDS or a non-DDS. The described aspects further perform, by the UE, a carrier aggregation power saving mode procedure for the one of the plurality of subscriptions based on a determination that the one of the plurality of subscriptions is configured as the DDS or the non-DDS.

In an aspect, a computer-readable medium may store computer executable code for optimizing power consumption in Multi-SIM devices for wireless communications is described. The described aspects include code for determining, by a UE in a MSMS mode, whether one of a plurality of subscriptions is configured as a DDS or a non-DDS. The described aspects further includes code for performing, by the UE, a carrier aggregation power saving mode procedure for the one of the plurality of subscriptions based on a determination that the one of the plurality of subscriptions is configured as the DDS or the non-DDS.

In an aspect, an apparatus for optimizing power consumption in Multi-SIM devices for wireless communications is described. The described aspects include means for determining, by a UE in a MSMS mode, whether one of a plurality of subscriptions is configured as a DDS or a non-DDS. The described aspects further includes means for performing, by the UE, a carrier aggregation power saving mode procedure for the one of the plurality of subscriptions based on a determination that the one of the plurality of subscriptions is configured as the DDS or the non-DDS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
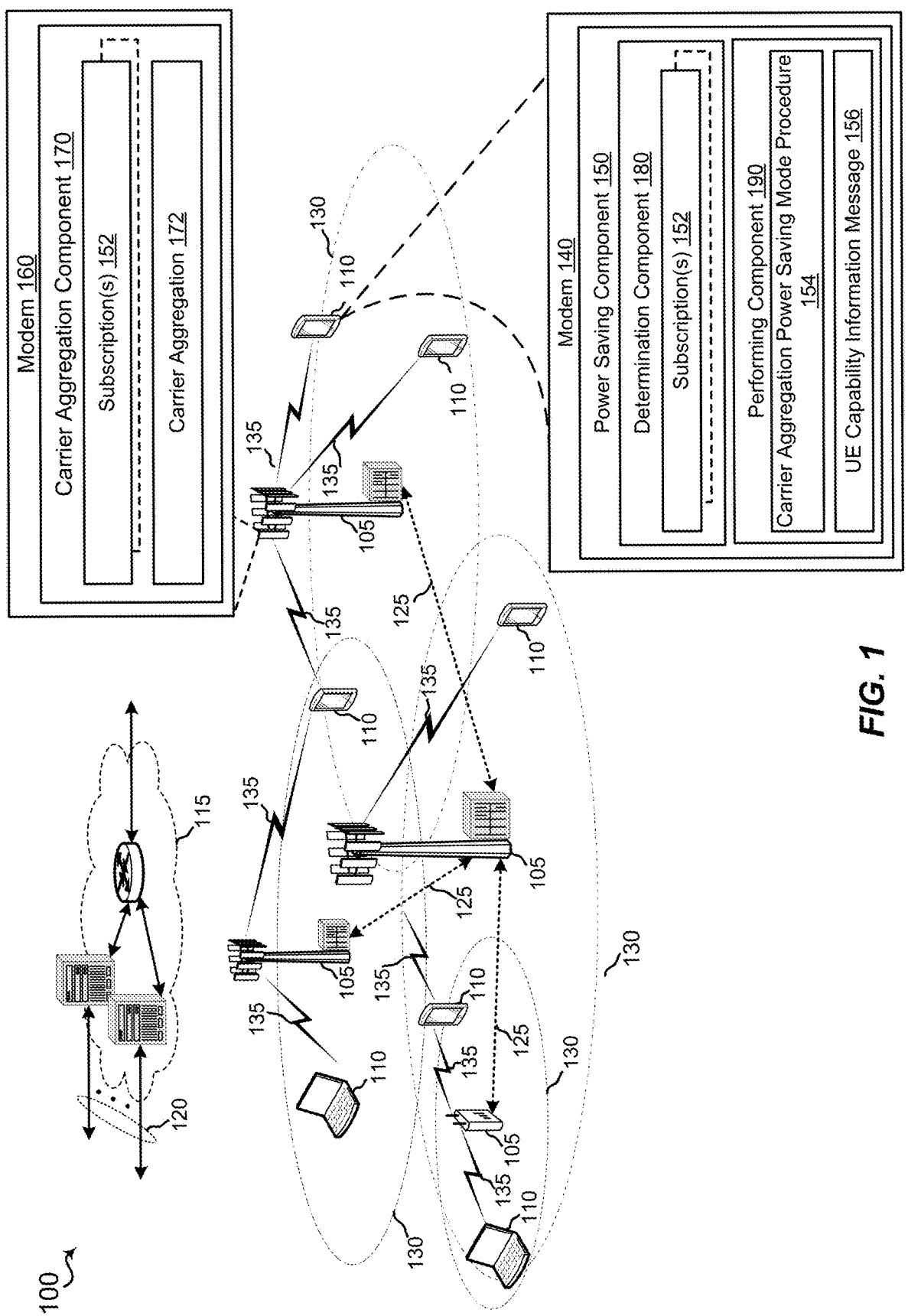
FIG. 1 is a schematic diagram of an example of a wireless communication network including at least one base station having a carrier aggregation component configured to receive UE capability information message(s) and configure carrier aggregation capabilities for one or more subscriptions and at least one UE having a power saving component configured to perform carrier aggregation power saving mode procedures.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to reducing power consumption in Multi-SIM (MSIM) devices in a wireless communication system. In an example, for one UE, multiple SIMs may be configured along with multiple subscribers, such as, a Dual-SIM Dual-Subscriber (DSDS). Both subscriptions may be LTE communication technologies (L+L) or a first subscription may be LTE while the second subscription is non-LTE, and the subscriptions may operate independently of one another. In this example, one of the subscriptions may be the primary subscription and set as a DDS while the other subscription may be the secondary subscription and set as a non-DDS. For example, the primary subscription (i.e., DDS) is configured to transfer data, such as, application data, along with Voice over LTE (VoLTE) traffic while the secondary subscription (i.e., non-DDS) is configured only for VoLTE traffic.

Generally, the majority of UEs are capable of supporting over 25 bands, such as LTE bands. As a result, UEs are configured to report UE capability information messages that include information for all of the bands to the network. Due to the number of bands, the message lengths of the UE capability information messages sent in the uplink may exceed 1500 bytes which increases uplink setup times. Due to all of these bands, carrier aggregation band combination possibilities also increase with downlink/uplink carrier aggregation combinations. These combinations can further increase the length of the UE capability information messages. Moreover, carrier aggregation configuration can cause additional components of the UE to be activated resulting in higher power consumption. Thus, the resulting power consumption adversely affects the UE configured in a MSMS mode even when only one of the subscriptions is configured for carrier aggregation.

In an aspect, a UE may be configured as a MSMS device, such as a DSDS device, that is running with LTE on both subscriptions, or LTE on one subscription and non-LTE on the other subscription. The UE broadcasts carrier aggregation capabilities on both subscriptions. However, in this example, only the primary subscription (i.e., DDS) requires a higher data rate (i.e., carrier aggregation throughput) to accommodate for data exchange of application data (e.g., browsing/streaming/etc.) while the secondary subscription (i.e., non-DDS) will only be used for VoLTE. Normally, the network configures secondary cells to UEs that have carrier aggregation capabilities, but this activation depends on the data activity and network loading. Once the secondary cell is configured, the UE configures front end components based on carrier aggregation combination requirements. This configuration of the front end components leads to an increase in power consumption. Further, the UE is also required to perform periodic measurements on the configured secondary cell irrespective of the primary cell channel conditions. Therefore, a subscription, such as the secondary subscription, that does not require carrier aggregation causes the UE to unnecessarily consume power. Moreover, when the UE is mobile, secondary cell configuration-removal becomes frequent due to varying channel conditions causing the UE to do additional signaling for a subscription (i.e., secondary subscription) that does not require carrier aggregation.

In an implementation at a UE, an example method of wireless communications includes determining, by a UE in a MSMS mode, whether one of a plurality of subscriptions is configured as a DDS or a non-DDS. Additionally, the method includes performing, by the UE, a carrier aggregation power saving mode procedure for the one of the plurality of subscriptions based on a determination that the one of the plurality of subscriptions is configured as the DDS or the non-DDS.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example of a wireless communication network 100 including at least one UE 110 and at least one base station 105. The UE 110 may include a modem 140 having a power saving component 150 that performs a carrier aggregation power saving mode procedure 154 in a wireless communication system. Further, the wireless communication network 100 includes at least one base station 105 with a modem 160 having a carrier aggregation component 170 that receives UE capability information messages 156 from a UE 110 and determines whether to configure one or more subscriptions 152 with carrier aggregation 172 capabilities.

In an aspect, the UE 110 and/or power saving component 150 may execute determination component 180 to determine, in a MSMS mode, whether one of a plurality of subscriptions 152 is configured as a Default Data Subscription (DDS) or a non-DDS. The UE 110 and/or power saving component 150 may execute performing component 190 to perform a carrier aggregation power saving mode procedure 154 for the one of the plurality of subscriptions 152 based on a determination that one of the plurality of subscriptions 152 is configured as the DDS or the non-DDS. In another example, the UE 110 and/or power saving component 150 may execute determination component 180 to determine whether one of the plurality of subscriptions 152 is configured as a primary subscription or a secondary subscription.

In an aspect, a UE, such as UE 110, may selectively broadcast carrier aggregation capabilities in order to reduce power consumption and enhance standby and talk time. For example, the UE 110 and/or the power saving component 150 may execute determination component 180 to determine which one of the subscriptions 152 is configured as the non-DDS, so as to prevent transmission of carrier aggregation capabilities for these subscriptions. The UE 110 may remove the carrier aggregation information from the UE capability information message 156 for the subscription is configured as the non-DDS. As a result, the length of the UE capability information message 156 will be reduced, and the network 100 will not configure secondary cells on the these subscriptions that are configured as the non-DDS. Further, UE 110 will not be required to activate additional components for carrier aggregation configurations or do periodic secondary cell measurements.

In an aspect, the UE 110 may also only broadcast carrier aggregation capabilities based on a threshold to reduce power consumption. For example, the threshold may correspond to battery charge levels of the UE and/or data usage. Regarding data usage, the user of a UE 110 may have a data plan that reduces data speeds after the user exceeds a data usage threshold for a period of time, and thus, there is no need for broadcasting carrier aggregation capabilities. Once a user exceeds the data usage threshold, the UE is throttled so as to prevent high speed data transfers.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum.

EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
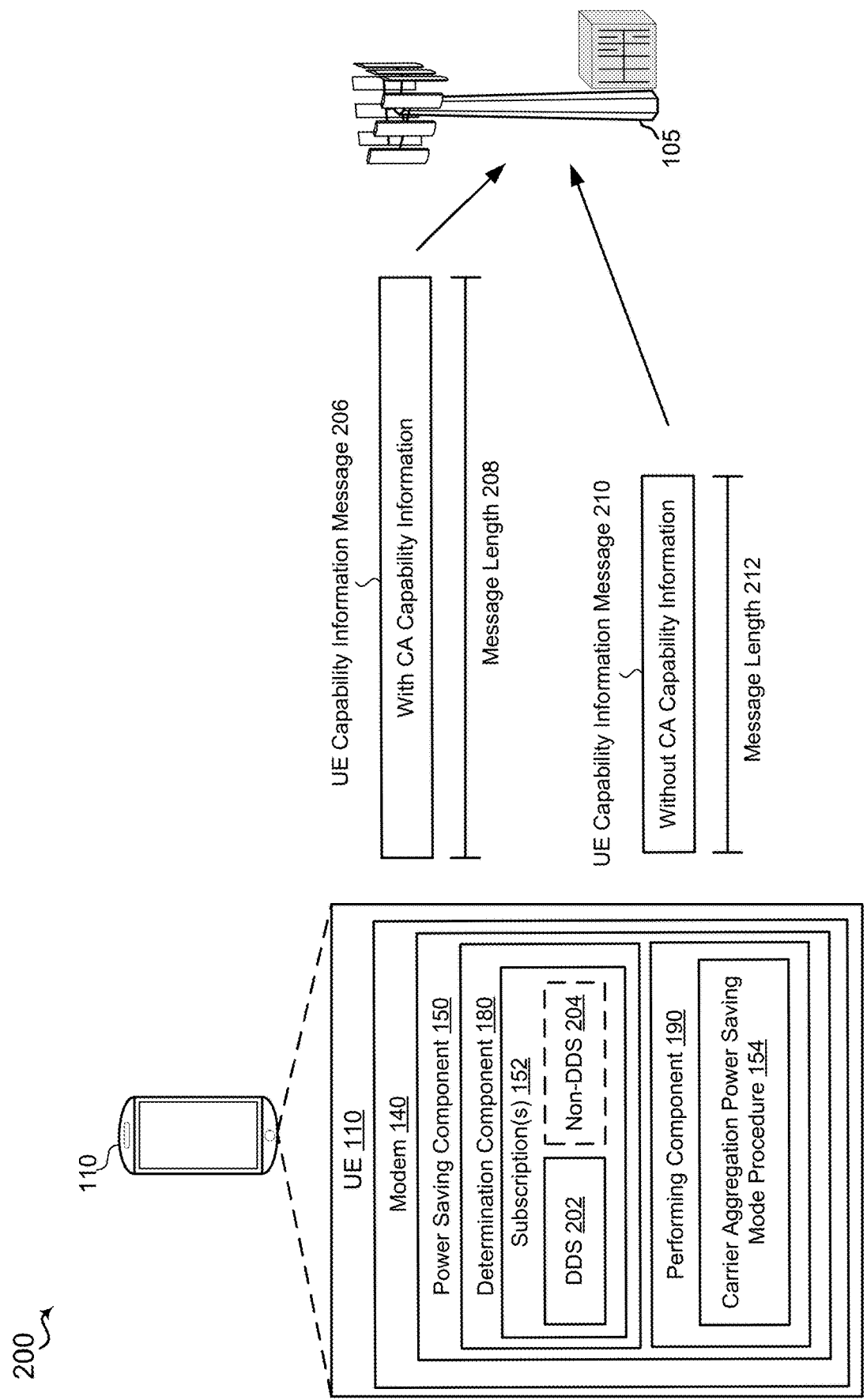
FIG. 2 is a conceptual diagram of an example carrier aggregation power saving mode procedure for reducing the length of a UE capability information message at a UE.

FIG. 2 depicts a conceptual diagram of an example carrier aggregation power saving mode procedure for reducing the length of a UE capability information message at a UE. For example, a UE and the base station may correspond to the UE 110 and the base station 105, respectively, located in wireless communication network 100 as shown in FIG. 1. Further, the UE 110 may include a modem 140 having a power saving component 150 that performs a carrier aggregation power saving mode procedure 154. Further, the base station 105 may include a modem 160 having a carrier aggregation component 170 that receive UE capability information message(s) and configure carrier aggregation capabilities for one or more subscriptions 152.

In an aspect, the UE 110 and/or power saving component 150 may execute determination component 180 to determine, in a MSMS mode, whether one of a plurality of subscriptions 152 is configured as a DDS or a non-DDS. In this example, one of the subscriptions may be the primary subscription and set as a DDS while the other subscription may be the secondary subscription and set as a non-DDS. For example, the primary subscription (i.e., the DDS 202) is configured to transfer data, such as, application data, along with Voice over LTE (VoLTE) traffic while the secondary subscription (i.e., the non-DDS 204) is configured only for VoLTE traffic. For example, the UE 110 and/or power saving component 150 may execute determination component 180 to determine that a first subscription corresponds to a DDS 202. For the DDS 202, the UE 110 and/or power saving component 150 may transmit, to a network entity 105, a UE capability information message 206 with carrier aggregation (CA) information. In this example, the UE capability information message 206 may have a message length 208. In some instances, the message length 208 may be greater than 1500 bytes.

In an aspect, the UE 110 and/or power saving component 150 may execute determination component 180 to determine that a second subscription corresponds to a non-DDS 204. For example, the UE 110 may execute power saving component 150 to perform a carrier aggregation power saving mode procedure 154 for the non-DDS 204. For the non-DDS 204, the UE 110 and/or power saving component 150 may then transmit, to a network entity 105, a UE capability information message 210 without carrier aggregation information. In this example, the UE capability information message 210 may have a message length 212 which is less than the message length 208. In some instances, the message length 208 may be less than 1500 bytes.

Figure 3:
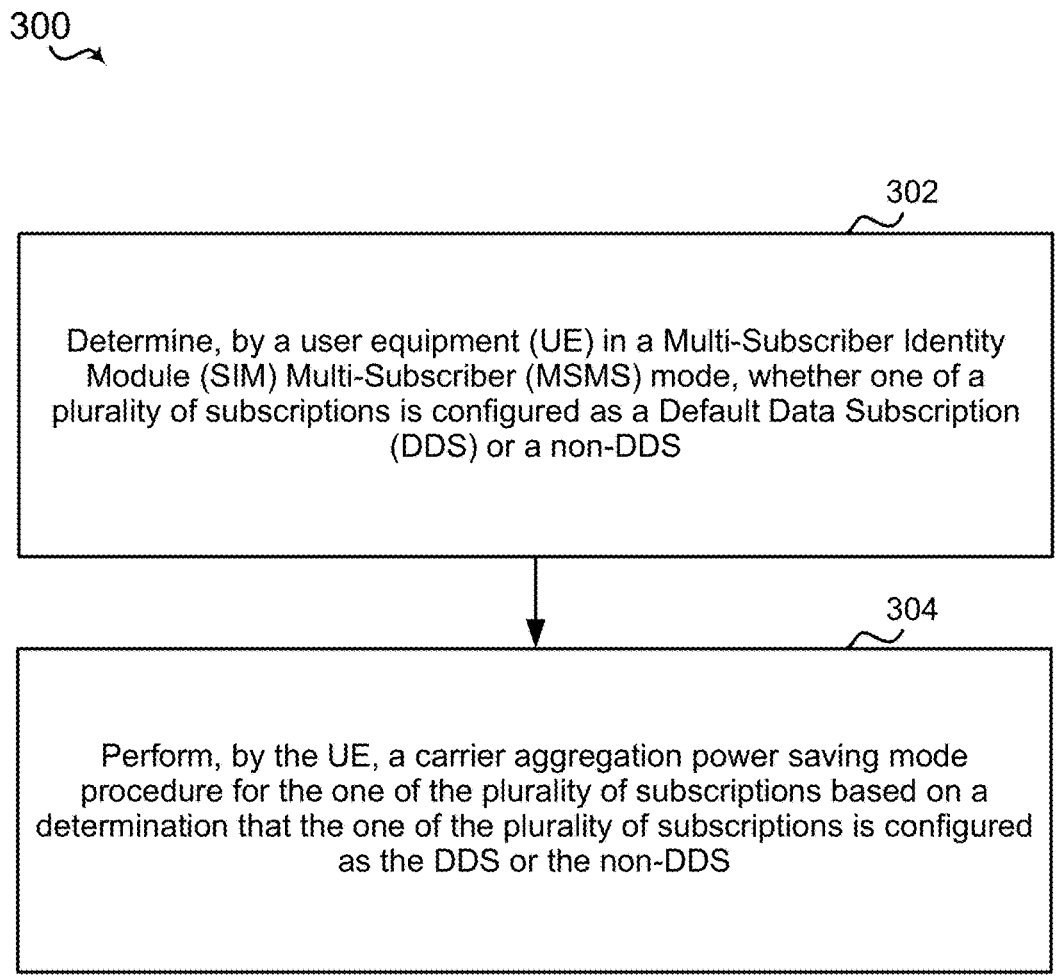
FIG. 3 is a flow diagram of an example of a method for optimizing power consumption in Multi-SIM devices for wireless communications at a UE.

Referring to FIG. 3, for example, a method 300 of wireless communication at UE 110 according to the above-described aspects to perform a carrier aggregation power saving mode procedure 154 in a wireless communication system includes one or more of the herein-defined actions.

At block 302, the method 300 may determine, by a UE in a MSMS mode, whether one of a plurality of subscriptions is configured as a DDS or a non-DDS. For example, the UE 110 may execute power saving component 150 to determine, in a MSMS mode, whether one of a plurality of subscriptions 152 is configured as a DDS or a non-DDS. In an example, the one of the plurality of subscriptions 152 corresponds to a VoLTE subscription. In another example, the DDS corresponds to a subscription configured to transfer data communications. Further, the UE 110 may execute power saving component 150 to determine whether one of the plurality of subscriptions 152 is configured as the DDS in response to at least one of powering on the UE 110 or performing a cell selection or reselection procedure based on an out-of-service indication.

At block 304, the method 300 may perform, by the UE 110, a carrier aggregation power saving mode procedure for the one of the plurality of subscriptions based on a determination that the one of the plurality of subscriptions is configured as the DDS or the non-DDS. For example, the UE 110 may execute power saving component 150 to perform a carrier aggregation power saving mode procedure 154 for the one of the plurality of subscriptions 152 based on a determination that the one of the plurality of subscriptions 152 is configured as the DDS or the non-DDS. FIGS. 3 and 4 describe example carrier aggregation power saving mode procedures 154 that the UE 110 may execute power saving component 150 to perform.

Figure 4A:
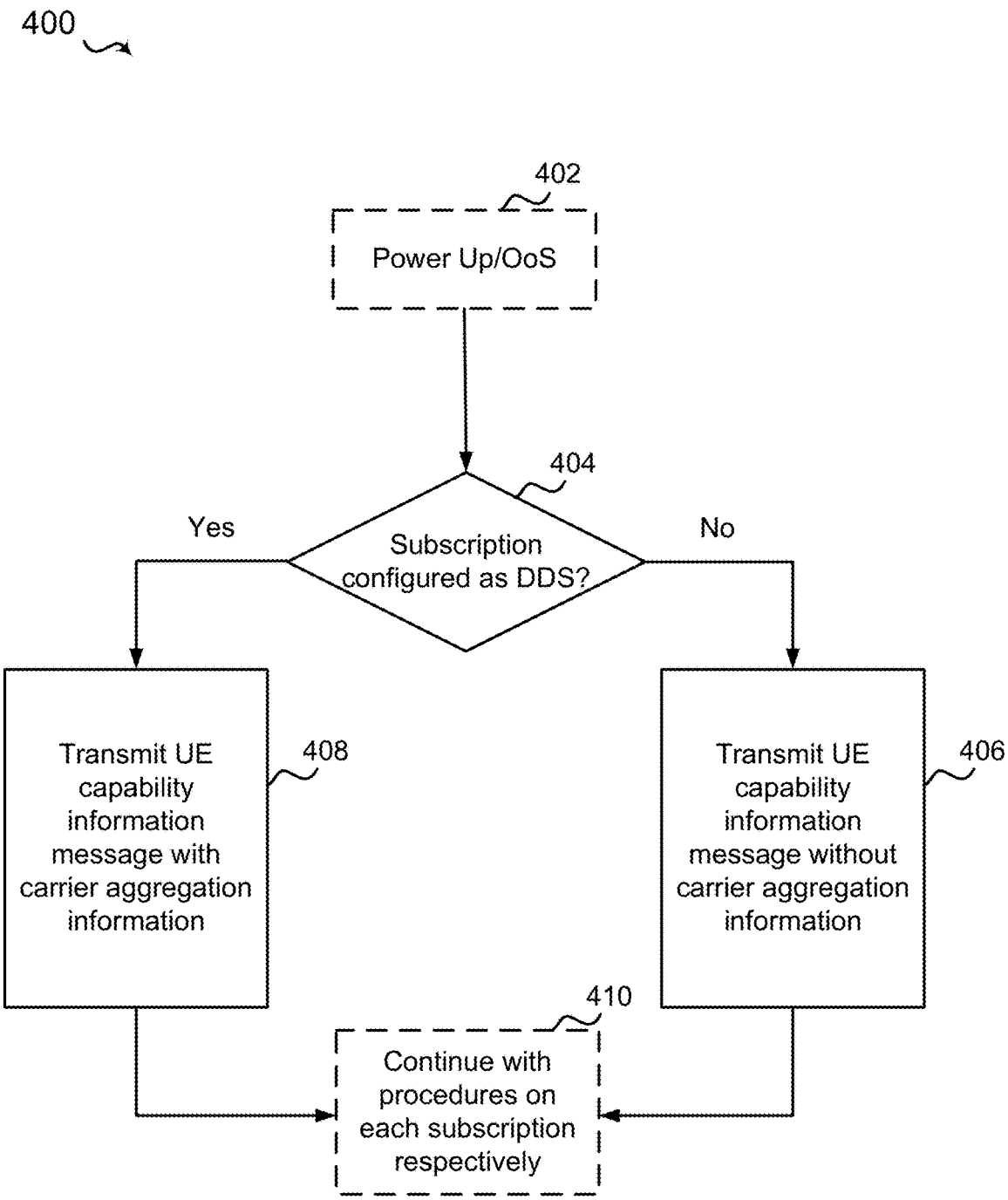
FIG. 4A is a flow diagram of an example of a method for performing a carrier aggregation power saving mode procedure at a UE.

Referring to FIG. 4A, for example, a method 400 of wireless communication at UE 110 according to the above-described aspects to selectively broadcast carrier aggregation capabilities in order to reduce power consumption in a wireless communication system includes one or more of the herein-defined actions.

At block 402, the method 400 may optionally power on the UE or perform a cell selection or reselection procedure based on an out-of-service indication. For example, the UE 110 may power on or perform a cell selection or reselection procedure based on an out-of-service indication. In an example, a UE, such as UE 110, may be configured to perform an attach procedure to a network 100 after powering on or performing cell selection or reselection procedures which results in the UE 110 being required to broadcast a UE capability information message(s) to the network entity 105 of network 100.

At block 404, the method 400 may determine, by a UE in a MSMS mode, whether one of a plurality of subscriptions is configured as a DDS or a non-DDS. For example, the UE 110 may execute the power saving component 150 to determine, in a MSMS mode, whether one of a plurality of subscriptions 152 is configured as a DDS or a non-DDS. If at block 404, the UE 110 determines that one of the plurality of subscriptions 152 is configured as a non-DDS then method 400 proceeds to block 406, otherwise method 400 proceeds to block 408.

At block 406, the method 400 may transmit, by the UE to a network entity, a UE capability information message without carrier aggregation information on the subscription that is determined to be the non-DDS subscription. For example, the UE 110 may execute the power saving component 150 to transmit, to a network entity 105, a UE capability information message 156 without carrier aggregation information on the subscription 152 that is determined to be a non-DDS subscription. In an example, transmitting the UE capability information message 156 without carrier aggregation information prevents configuration of a secondary cell on the subscription 152 that is determined to be the non-DDS subscription by the network entity 105.

At block 408, the method 400 may transmit, by the UE to a network entity, a UE capability information message with carrier aggregation information on the subscription that is determined to be DDS subscription. For example, the UE 110 may execute the power saving component 150 to transmit, to a network entity 105, a UE capability information message 156 with carrier aggregation information on the subscription 152 that is determined to be DDS subscription.

At block 410, the method 400 may continue with procedures on each subscription respectively. For example, the UE 110 may execute power saving component 150 to continue with procedures on each subscription 152 respectively.

Figure 4B:
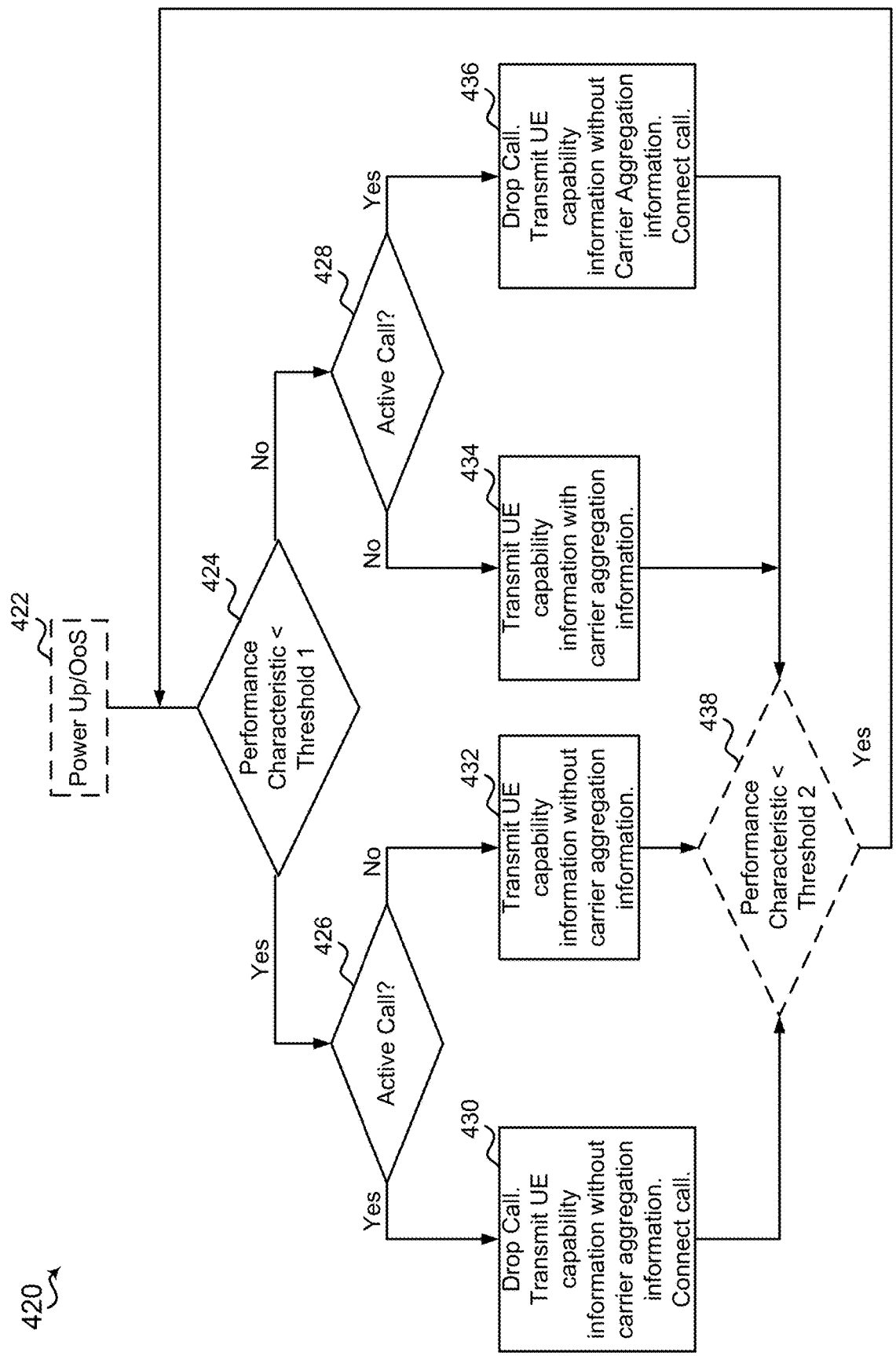
FIG. 4B is a flow diagram of another example of a method for performing a carrier aggregation power saving mode procedure at a UE.

Referring to FIG. 4B, for example, a method 420 of wireless communication at UE 110 according to the above-described aspects to broadcast carrier aggregation capabilities for a subscription configured as a DDS based on one or more thresholds to reduce power consumption in a wireless communication system includes one or more of the herein-defined actions.

At block 422, the method 420 may optionally power on the UE or perform a cell selection or reselection procedure based on an out-of-service indication. For example, the UE 110 may powering on or performing a cell selection or reselection procedure based on an out-of-service indication. In an example, a UE, such as UE 110, may be configured to perform an attach procedure to a network 100 after powering on or performing cell selection or reselection procedures which result in the UE 110 being required to broadcast UE capability information messages to the network entity 105 of network 100.

At block 424, the method 420 may determine whether a performance characteristic of the UE satisfies a first performance threshold. For example, the UE 110 may execute the power saving component 150 to determine whether a performance characteristic of the UE 110 satisfies a first performance threshold. In an example, the performance characteristic of the UE 110 corresponds to at least one of a charge level of a battery of the UE 110 or a data usage of the UE 110, and the first performance threshold corresponds to at least one of a first battery charge level threshold or a first data usage threshold. The first battery charge level threshold can correspond to a critical charge level of the battery. In an example, satisfying the first performance threshold includes determining whether the performance characteristic is less than the first performance threshold.

If at block 424, UE 110 determines that the performance characteristic of the UE 110 satisfies the first performance threshold then method 420 proceeds to block 426, otherwise method 420 proceeds to block 428.

At block 426, the method 420 may determine whether the UE is engaged in an active call on the one of the plurality of subscriptions. For example, the UE 110 may execute the power saving component 150 to determine whether the UE 110 is engaged in an active call on the one of the plurality of subscriptions 152. If at block 426, the UE 110 determines that an active call is currently engaged then method 420 proceeds to block 430, otherwise method 420 proceeds to block 432.

At block 428, the method 420 may determine whether the UE is engaged in an active call on the one of the plurality of subscriptions. For example, the UE 110 may execute the power saving component 150 to determine whether the UE 110 is engaged in an active call on the one of the plurality of subscriptions 152. If at block 428, the UE 110 determines that an active call is currently engaged then method 420 proceeds to block 436, otherwise method 420 proceeds to block 434.

At block 430, the method 420 may disconnect from the active call based on a determination that the UE is engaged in the active call, transmit, to a network entity, a UE capability information message without carrier aggregation information on the subscription based on the determination whether the performance characteristic of the UE satisfies the first performance threshold, and connect to a new call on the one subscription in response to transmitting the UE capability information message without the carrier aggregation information. For example, the UE 110 may execute the power saving component 150 to disconnect from the active call based on a determination that the UE 110 is engaged in an active call, transmit, to a network entity 105, a UE capability information message 156 without carrier aggregation information on the subscription 152 based on the determination whether the performance characteristic of the UE 110 satisfies the first performance threshold, and connect to a new call on the one subscription 152 in response to transmitting the UE capability information message 156 without the carrier aggregation information.

At block 432, the method 420 may transmit, by the UE to a network entity, a UE capability information message without carrier aggregation information on the subscription that is determined to be non-DDS subscription. For example, the UE 110 may execute the power saving component 150 to transmit, to a network entity, a UE capability information message 156 without carrier aggregation information on the subscription 152 based on the determination that the performance characteristic of the UE satisfies the first performance threshold and the determination that the UE 110 is not engaged in the active call.

At block 434, the method 420 may transmit, by the UE to a network entity, a UE capability information message with carrier aggregation information on the subscription that is determined to be DDS subscription. For example, the UE 110 may execute the power saving component 150 to transmit, to a network entity, a UE capability information message 156 with carrier aggregation information on the subscription 152 based on the determination that the performance characteristic of the UE 110 fails to satisfy the first performance threshold and the determination that the UE 110 is not engaged in the active call.

At block 436, the method 420 may disconnect from the active call based on a determination that the UE is engaged in the active call, transmit, to a network entity, a UE capability information message without carrier aggregation information on the subscription based on the determination whether the performance characteristic of the UE satisfies the first performance threshold, and connect to a new call on the one subscription in response to transmitting the UE capability information message without the carrier aggregation information. For example, the UE 110 may execute the power saving component 150 to disconnect from the active call based on a determination that the UE 110 is engaged in the active call, transmit, to a network entity 105, a UE capability information message 156 without carrier aggregation information on the subscription 152 based on the determination whether the performance characteristic of the UE 110 satisfies the first performance threshold, and connect to a new call on the one subscription 152 in response to transmitting the UE capability information message 156 without the carrier aggregation information.

At block 438, the method 420 may determine whether the performance characteristic of the UE satisfies a second performance threshold. For example, the UE 110 may execute the power saving component 150 to determine whether the performance characteristic of the UE 110 satisfies a second performance threshold. In an example, the performance characteristic of the UE 110 corresponds to at least one of a charge level of a battery of the UE 110 or a data usage of the UE 110, and the second performance threshold corresponds to at least one of a second battery charge level threshold or a second data usage threshold. The second battery charge level threshold corresponds to a minimum charge level of the battery needed for the UE 110 to support carrier aggregation 172. In an example, satisfying the second performance threshold includes determining whether the performance characteristic is less than the second performance threshold.

If at block 424, the UE 110 determines that the performance characteristic of the UE 110 satisfies the second performance threshold then method 420 proceeds to block 424, otherwise method 420 remains at block 438.

Figure 5:
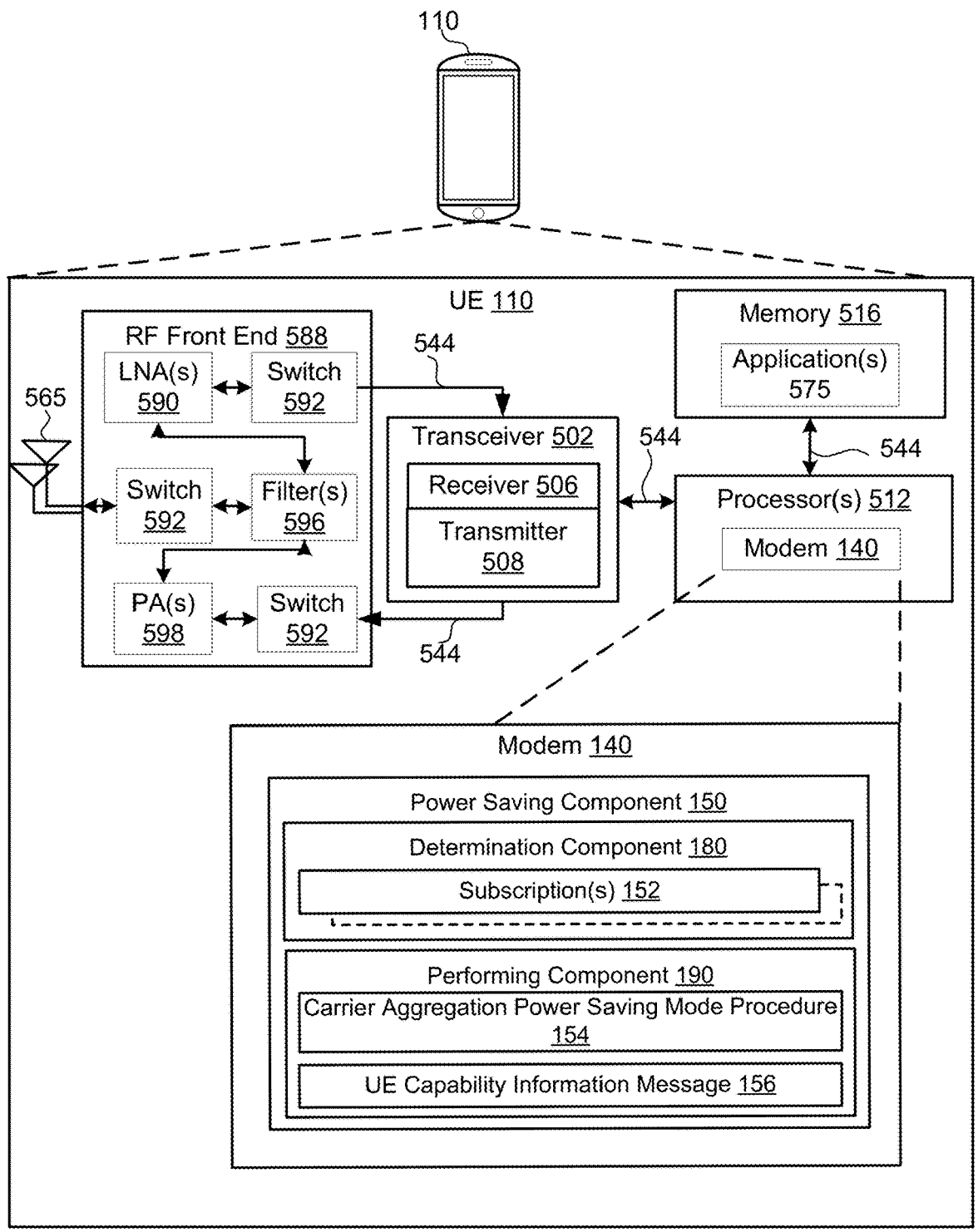
FIG. 5 is a schematic diagram of example components of the UE of FIG. 1.

Referring to FIG. 5, one example of an implementation of an UE 110 may include a variety of components, some of which have already been described above, but including components such as one or more processors 512 and memory 516 and transceiver 502 in communication via one or more buses 544, which may operate in conjunction with modem 140 and power saving component 150. Further, the one or more processors 512, modem 140, memory 516, transceiver 502, radio frequency (RF) front end 588 and one or more antennas 565, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 512 can include a modem 140 that uses one or more modem processors. The various functions related to power saving component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with power saving component 150 may be performed by transceiver 502.

Also, the memory 516 may be configured to store data used herein and/or local versions of applications 575 or power saving component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining power saving component 150 and/or one or more of its subcomponents, and/or data associated therewith, when UE 110 is operating at least one processor 512 to execute power saving component 150 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a RF receiver. In an aspect, the receiver 506 may receive signals transmitted by at least one base station 105. Additionally, the receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may include, but is not limited to, an RF transmitter.

Moreover, in an aspect, the UE 110 may include the RF front end 588, which may operate in communication with one or more antennas 565 and transceiver 502 for receiving and transmitting radio transmissions, for example, wireless communications transmitted by at least one base station 105 or wireless transmissions transmitted by the UE 110. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, the one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and a corresponding specified gain value based on a desired gain value for a particular application.

Also, for example, the one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by transceiver 502 and/or processor 512.

As such, the transceiver 502 may be configured to transmit and receive wireless signals through one or more antennas 565 via the RF front end 588. In an aspect, transceiver may be tuned to operate at specified frequencies such that the UE 110 can communicate with, for example, the one or more base stations 105 or one or more cells associated with one or more base stations 105. In an aspect, for example, the modem 140 can configure the transceiver 502 to operate at a specified frequency and power level based on the UE configuration of the UE 110 and the communication protocol used by the modem 140.

In an aspect, the modem 140 can be a multiband-multimode modem, which can process digital data and communicate with the transceiver 502 such that the digital data is sent and received using the transceiver 502. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 6:
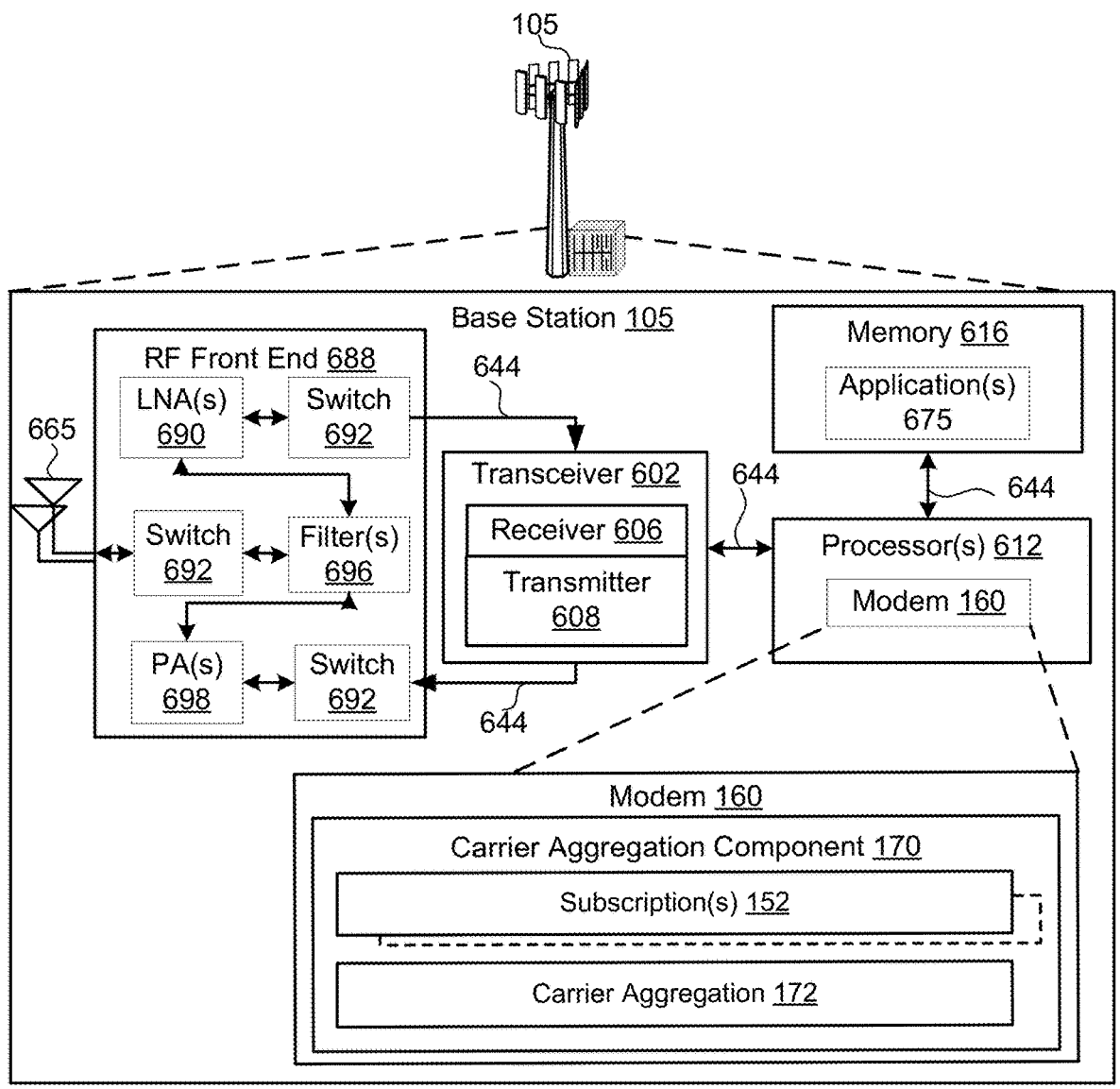
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with the modem 160 and carrier aggregation component 170 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method, comprising:
   determining, by a user equipment (UE) in a Multi-Subscriber Identity Module (SIM) Multi-Subscriber (MSMS) mode, whether one of a plurality of subscriptions is configured as a Default Data Subscription (DDS) or a non-DDS; and
   performing, by the UE, a carrier aggregation power saving mode procedure for the one of the plurality of subscriptions based on a determination that the one of the plurality of subscriptions is configured as the DDS or the non-DDS, wherein a size of UE capability information message on the non-DDS is reduced by exclusion of carrier aggregation information; wherein said performing the carrier aggregation power saving mode procedure further comprises:
   determining whether a performance characteristic of the UE satisfies a first performance threshold;
   determining whether the UE is engaged in an active call on the one of the plurality of subscriptions;
   disconnecting from the active call based on a determination that the UE is engaged in the active call;
   transmitting, by the UE to a network entity, a UE capability information message without carrier aggregation information on the subscription based on the determination whether the performance characteristic of the UE satisfies the first performance threshold; and
   connecting to a new call on the one subscription in response to transmitting the UE capability information message without the carrier aggregation information.

2. The method of claim 1, wherein performing the carrier aggregation power saving mode procedure for the one of the plurality of subscriptions based on the determination that the one of the plurality is configured as the non-DDS further comprises:
   transmitting, by the UE to a network entity, a UE capability information message without carrier aggregation information on the subscription that is determined to be the non-DDS subscription.

3. The method of claim 2, wherein transmitting the UE capability information message without carrier aggregation information prevents configuration of a secondary cell on the subscription that is determined to be the non-DDS subscription by the network entity.

4. The method of claim 1, wherein performing the carrier aggregation power saving mode procedure for the one of the plurality of subscriptions based on the determination that the one of the plurality is configured as the DDS further comprises:
   transmitting, by the UE to a network entity, a UE capability information message with carrier aggregation information on the subscription that is determined to be the DDS subscription.

5. The method of claim 1, further comprising:
   transmitting, by the UE to the network entity, the UE capability information message with the carrier aggregation information on the subscription based on the determination that the performance characteristic of the UE fails to satisfy the first performance threshold and the determination that the UE is not engaged in the active call.

6. The method of claim 1, further comprising:
   transmitting, by the UE to the network entity, the UE capability information message without the carrier aggregation information on the subscriptions based on the determination that the performance characteristic of the UE satisfies the first performance threshold and the determination that the UE is not engaged in the active call.

7. The method of claim 1, further comprising:
   wherein in response to determining whether the performance characteristic of the UE satisfies a second performance threshold and determining whether the performance characteristic of the UE satisfies the first performance threshold, determine whether the UE is engaged in an active call on the one of the plurality of subscriptions.

8. The method of claim 7, wherein the performance characteristic of the UE corresponds to at least one of a charge level of a battery of the UE or a data usage of the UE, and wherein the second performance threshold corresponds to at least one of a second battery charge level threshold or a second data usage threshold.

9. The method of claim 8, wherein the second battery charge level threshold corresponds to a minimum charge level of the battery needed for the UE to support carrier aggregation.

10. The method of claim 1, wherein the performance characteristic of the UE corresponds to at least one of a charge level of a battery of the UE or a data usage of the UE, and wherein the first performance threshold corresponds to at least one of a first battery charge level threshold or a first data usage threshold.

11. The method of claim 10, wherein the first battery charge level threshold corresponds to a critical charge level of the battery.

12. The method of claim 1, wherein the one of the plurality of subscriptions corresponds to a Voice over Long Term Evolution (VoLTE) subscription.

13. The method of claim 1, wherein the DDS corresponds to a subscription configured to transfer data communications.

14. The method of claim 1, wherein determining whether one of the plurality of subscriptions is configured as the DDS further comprises determining whether one of the plurality of subscriptions is configured as the DDS in response to at least one of powering on the UE or performing a cell selection or reselection procedure based on an out-of-service indication.

15. An apparatus, comprising:
   a memory; and
   a processor in communication with the memory, wherein the processor is configured to perform:
   determine, by a user equipment (UE) in a Multi-Subscriber Identity Module (SIM) Multi-Subscriber (MSMS) mode, whether one of a plurality of subscriptions is configured as a Default Data Subscription (DDS) or a non-DDS; and
   perform, by the UE, a carrier aggregation power saving mode procedure for the one of the plurality of subscriptions based on a determination that the one of the plurality of subscriptions is configured as the DDS or the non-DDS, wherein a size of UE capability information message on the non-DDS is reduced by exclusion of carrier aggregation information; wherein the processor configured to perform the carrier aggregation power saving mode procedure is further configured to:
   determine whether a performance characteristic of the UE satisfies a first performance threshold;
   determine whether the UE is engaged in an active call on the one of the plurality of subscriptions;

disconnect from the active call based on a determination that the UE is engaged in the active call;
transmit, by the UE to a network entity, a UE capability information message without carrier aggregation information on the subscription based on the determination whether the performance characteristic of the UE satisfies the first performance threshold; and
connect to a new call on the one subscription in response to transmitting the UE capability information message without the carrier aggregation information.

16. The apparatus of claim 15, wherein the processor configured to perform the carrier aggregation power saving mode procedure for the one of the plurality of subscriptions based on the determination that the one of the plurality is configured as the non-DDS further is further configured to:
transmit, by the UE to a network entity, a UE capability information message without carrier aggregation information on the subscription that is determined to be the non-DDS subscription.

17. The apparatus of claim 16, wherein transmitting the UE capability information message without carrier aggregation information prevents configuration of a secondary cell on the subscription that is determined to be the non-DDS subscription by the network entity.

18. The apparatus of claim 15, wherein the processor configured to perform the carrier aggregation power saving mode procedure for the one of the plurality of subscriptions based on the determination that the one of the plurality is configured as the DDS further is further configured to:
transmit, by the UE to a network entity, a UE capability information message with carrier aggregation information on the subscription that is determined to be the DDS subscription.

19. The apparatus of claim 15, wherein the processor is further configured to:
transmit, by the UE to the network entity, the UE capability information message with the carrier aggregation information on the subscription based on the determination that the performance characteristic of the UE fails to satisfy the first performance threshold and the determination that the UE is not engaged in the active call.

20. The apparatus of claim 15, wherein the processor is further configured to:
transmit, by the UE to the network entity, the UE capability information message without the carrier aggregation information on the subscriptions based on the determination that the performance characteristic of the UE satisfies the first performance threshold and the determination that the UE is not engaged in the active call.

21. The apparatus of claim 15, wherein the processor configured to determine whether the performance characteristic of the UE satisfies a second performance threshold and determine whether the performance characteristic of the UE satisfies the first performance threshold, is further configured to determine whether the UE is engaged in an active call on the one of the plurality of subscriptions.

22. The apparatus of claim 21, wherein the performance characteristic of the UE corresponds to at least one of a charge level of a battery of the UE or a data usage of the UE, and wherein the second performance threshold corresponds to at least one of a second battery charge level threshold or a second data usage threshold.

23. The apparatus of claim 22, wherein the second battery charge level threshold corresponds to a minimum charge level of the battery needed for the UE to support carrier aggregation.

24. The apparatus of claim 15, wherein the performance characteristic of the UE corresponds to at least one of a charge level of a battery of the UE or a data usage of the UE, and wherein the first performance threshold corresponds to at least one of a first battery charge level threshold or a first data usage threshold.

25. The apparatus of claim 24, wherein the first battery charge level threshold corresponds to a critical charge level of the battery.

26. The apparatus of claim 15, wherein the processor configured to determine whether one of the plurality of subscriptions is configured as the DDS is further configured to determine whether one of the plurality of subscriptions is configured as the DDS in response to at least one of powering on the UE or performing a cell selection or reselection procedure based on an out-of-service indication.

27. An apparatus, comprising:
means for determining, by a user equipment (UE) in a Multi-Subscriber Identity Module (SIM) Multi-Subscriber (MSMS) mode, whether one of a plurality of subscriptions is configured as a Default Data Subscription (DDS) or a non-DDS; and
means for performing, by the UE, a carrier aggregation power saving mode procedure for the one of the plurality of subscriptions based on a determination that the one of the plurality of subscriptions is configured as the DDS or the non-DDS, wherein a size of UE capability information message on the non-DDS is reduced by exclusion of carrier aggregation information; wherein said means for performing the carrier aggregation power saving mode procedure further comprises:
means for determining whether a performance characteristic of the UE satisfies a first performance threshold;
means for determining whether the UE is engaged in an active call on the one of the plurality of subscriptions;
means for disconnecting from the active call based on a determination that the UE is engaged in the active call;
means for transmitting, by the UE to a network entity, a UE capability information message without carrier aggregation information on the subscription based on the determination whether the performance characteristic of the UE satisfies the first performance threshold; and
means for connecting to a new call on the one subscription in response to transmitting the UE capability information message without the carrier aggregation information.

28. A non-transitory computer-readable medium storing computer code executable for wireless communications, comprising:
code for determining, by a user equipment (UE) in a Multi-Subscriber Identity Module (SIM) Multi-Subscriber (MSMS) mode, whether one of a plurality of subscriptions is configured as a Default Data Subscription (DDS) or a non-DDS; and
code for performing, by the UE, a carrier aggregation power saving mode procedure for the one of the plurality of subscriptions based on a determination that the one of the plurality of subscriptions is configured as the DDS or the non-DDS, wherein a size of UE capability information message on the non-DDS is reduced by exclusion of carrier aggregation information; wherein said code for performing the carrier aggregation power saving mode procedure further comprises:

code for determining whether a performance characteristic of the UE satisfies a first performance threshold;

code for determining whether the UE is engaged in an active call on the one of the plurality of subscriptions;

code for disconnecting from the active call based on a determination that the UE is engaged in the active call;

code for transmitting, by the UE to a network entity, a UE capability information message without carrier aggregation information on the subscription based on the determination whether the performance characteristic of the UE satisfies the first performance threshold; and code for connecting to a new call on the one subscription in response to transmitting the UE capability information message without the carrier aggregation information.

* * * * *